US012504541B2

(12) United States Patent
Mueller et al.

(10) Patent No.: US 12,504,541 B2
(45) Date of Patent: Dec. 23, 2025

(54) SYSTEMS AND METHODS FOR DETERMINING A DRIVABLE SURFACE

(71) Applicant: Rivian IP Holdings, LLC, Plymouth, MI (US)

(72) Inventors: Martin Fritz Mueller, San Jose, CA (US); Gary Fay, Hermosa Beach, CA (US); Vikram Vijayanbabu Appia, San Jose, CA (US)

(73) Assignee: Rivian IP Holdings, LLC, Plymouth, MI (US)

( * ) Notice: Subject to any disclaimer, the term of this patent is extended or adjusted under 35 U.S.C. 154(b) by 922 days.

(21) Appl. No.: 17/551,798

(22) Filed: Dec. 15, 2021

(65) Prior Publication Data

US 2023/0184954 A1    Jun. 15, 2023

(51) Int. Cl.
*G01S 17/931* (2020.01)
*G01S 7/48* (2006.01)
*G01S 17/89* (2020.01)
*G06V 20/56* (2022.01)
*G06V 20/58* (2022.01)

(52) U.S. Cl.
CPC .......... *G01S 17/931* (2020.01); *G01S 7/4808* (2013.01); *G01S 17/89* (2013.01); *G06V 20/58* (2022.01); *G06V 20/588* (2022.01)

(58) Field of Classification Search
CPC ...... G01S 17/931; G01S 7/4808; G01S 17/89; G01S 7/4802; G01S 7/4804; G06V 20/58; G06V 20/588; G06V 20/64; G01C 21/265; G01C 21/34
See application file for complete search history.

(56) References Cited

U.S. PATENT DOCUMENTS

| | | | | |
|---|---|---|---|---|
| 2017/0057495 | A1* | 3/2017 | Walessa | G01S 17/89 |
| 2020/0118285 | A1* | 4/2020 | Metzner | G06V 20/58 |
| 2020/0158874 | A1* | 5/2020 | Li | G06V 20/584 |
| 2021/0183093 | A1* | 6/2021 | Park | G06V 20/588 |
| 2022/0097731 | A1* | 3/2022 | Xu | G01C 21/3602 |
| 2022/0111868 | A1* | 4/2022 | Costea | B60W 30/0956 |

FOREIGN PATENT DOCUMENTS

| | | |
|---|---|---|
| CN | 109753982 A | 5/2019 |
| CN | 109849936 A | 6/2019 |
| CN | 110008941 A | 7/2019 |

OTHER PUBLICATIONS

Fengjiao, "Application of terrestrial LiDAR technology and moving least squares method in 3D modeling", Science of Surveying and Mapping, vol. 37, No. 4, Jul. 2012, pp. 93-95 (English Abstract submitted).

* cited by examiner

*Primary Examiner* — Ig T An
(74) *Attorney, Agent, or Firm* — Haley Guiliano LLP (57) ABSTRACT

Systems and methods are provided for identifying a drivable area in front of a vehicle. A three-dimensional measurement sensor captures three-dimensional data corresponding to an area in front of the vehicle. Processing circuitry compares the captured three-dimensional data with a three-dimensional ground model to identify at least one obstacle and determine a drivable area in front of the vehicle based on the comparison.

19 Claims, 8 Drawing Sheets

SYSTEMS AND METHODS FOR DETERMINING A DRIVABLE SURFACE

INTRODUCTION

In autonomous and semi-autonomous vehicles, it is necessary for the vehicle to perceive the surrounding environment accurately. For example, it can be useful for the vehicle to determine if there is an obstacle in the driving path of the vehicle. However, vehicles may fail to correctly distinguish between the ground (which is drivable) and an obstacle (which may not be drivable).

SUMMARY

In one approach, in order to correctly identify obstacles on a road surface (e.g., other vehicles), ground detection (or ground plane removal) relies on the road surface being a planar surface. However, if the vehicle is driven in off-road environments or in certain urban areas (e.g., areas including ramps and curbs), this approach may not accurately identify the actual ground plane. As a result, this approach may not correctly identify obstacles on the driving surface. In other approaches, to avoid having to identify the actual ground plane, sensors are oriented so they do not intentionally measure the ground, or ground measurements are filtered out as noise. However, in these approaches, certain obstacles having a low profile or obstacles in an-off road environment may not be correctly identified. Additionally, these approaches may fail on driving surfaces having a steep incline which causes the ground to appear in the field of view of the sensors.

In some embodiments, in order to solve one or more of these problems, systems and methods are provided to accurately identify a drivable area in front of a vehicle, especially in off-road or urban environments.

The method of identifying a drivable area in front of a vehicle includes capturing, with a three-dimensional measurement sensor, three-dimensional data corresponding to an area in front of the vehicle, comparing the captured three-dimensional data with a three-dimensional ground model to identify at least one obstacle, and determining a drivable area in front of the vehicle based on the comparison.

In some embodiments, the method may further include generating the three-dimensional ground model based on the captured three-dimensional data.

In some embodiments, generating the three-dimensional ground model may include fitting a three-dimensional smooth surface based on the captured three-dimensional data. The slope of any portion of the three-dimensional smooth surface may not exceed a threshold value.

In some embodiments, fitting the three-dimensional smooth surface based on the captured three-dimensional data may include dividing the area in front of the vehicle into a grid comprising a plurality of cells and for each cell having height data, identifying a minimum height value based on the captured three-dimensional data. If a minimum height value is higher than the surrounding minimum height values by greater than a predetermined amount, reducing the minimum height value such that the minimum height value is not higher than the surrounding minimum height values by greater than the predetermined amount, and fitting the three-dimensional smooth surface to the minimum height values and any reduced minimum height values.

In some embodiments, fitting the three-dimensional smooth surface based on the captured three-dimensional data may further include, for each cell not having height data, assigning a null value, and replacing the assigned null values with height values corresponding to a local slope of the three-dimensional smooth surface adjacent to the cells not having height data.

In some embodiments, comparing the captured three-dimensional data with the three-dimensional ground model to identify at least one obstacle may include determining height differences between the captured three-dimensional data and the three-dimensional ground model, and identifying at least one region where the determined height differences exceed an obstacle threshold value.

In some embodiments, the three-dimensional measurement sensor may be a LIDAR sensor.

In some embodiments, the method may further include determining a location of the vehicle, and retrieving, from a memory, the three-dimensional ground model based on the determined location of the vehicle.

In some embodiments, the method may further include determining if the retrieved three-dimensional ground model is valid by comparing the captured three-dimensional data with the retrieved three-dimensional ground model. In response to determining that the retrieved three-dimensional ground model is valid, the comparing may include comparing the captured three-dimensional data with the retrieved three-dimensional ground model. In response to determining that the retrieved three-dimensional ground model is not valid, the comparing may include comparing the captured three-dimensional data with a three-dimensional ground model generated based on the captured three-dimensional data.

In some embodiments, the method may further include dividing the area in front of the vehicle into a grid comprising a plurality of cell, and for each cell having height data, identifying a height value based on the captured three-dimensional data. The comparing may include determining height differences between the identified height values and corresponding height values included in the retrieved three-dimensional ground model, and identifying at least one region where the determined height differences exceed an obstacle threshold value.

The system for identifying a drivable area in front of a vehicle includes a three-dimensional measurement sensor configured to capture three-dimensional data corresponding to an area in front of the vehicle. The system further includes processing circuitry configured to compare the captured three-dimensional data with a three-dimensional ground model to identify at least one obstacle, and determine a drivable area in front of the vehicle based on the comparison.

A non-transitory computer-readable medium is provided. The non-transitory computer-readable medium has non-transitory computer-readable instructions encoded thereon that, when executed by a processor, causes the processor to compare three-dimensional data corresponding to an area in front of a vehicle with a three-dimensional ground model to identify at least one obstacle, and determine a drivable area in front of the vehicle based on the comparison. The three-dimensional data is captured with a three-dimensional measurement sensor.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

FIG. 1 shows a block diagram of components of a system of a vehicle configured to identify a drivable area in front of the vehicle, in accordance with some embodiments of the present disclosure.

DETAILED DESCRIPTION

Figure 1:
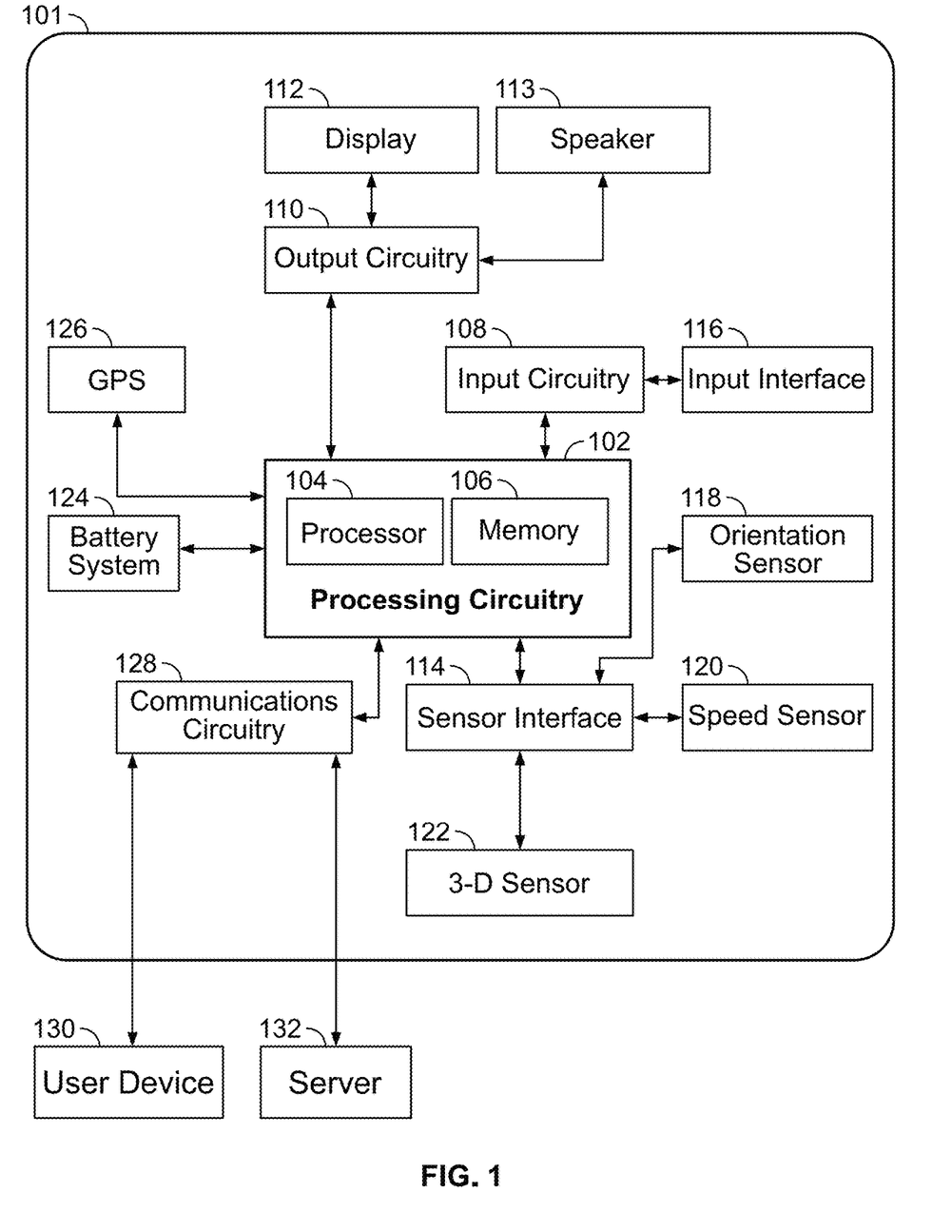

FIG. 1 shows a block diagram of components of a system of a vehicle 101 configured to identify a drivable area in front of vehicle 101, in accordance with some embodiments of the present disclosure. Vehicle 101 may be a car (e.g., a coupe, a sedan, a truck, an SUV, a bus), a motorcycle, an aircraft (e.g., a drone), a watercraft (e.g., a boat), or any other type of vehicle.

Vehicle 101 may comprise processing circuitry 102, which may comprise processor 104 and memory 106. Processor 104 may comprise a hardware processor, a software processor (e.g., a processor emulated using a virtual machine), or any combination thereof. In some embodiments, processor 104 and memory 106 in combination may be referred to as processing circuitry 102 of vehicle 101. In some embodiments, processor 104 alone may be referred to as processing circuitry 102 of vehicle 101. Memory 106 may comprise hardware elements for non-transitory storage of commands or instructions, that, when executed by processor 104, cause processor 104 to operate vehicle 101 in accordance with embodiments described above and below. Processing circuitry 102 may be communicatively connected to components of vehicle 101 via one or more wires, or via wireless connection.

Processing circuitry 102 may be communicatively connected to input interface 116 (e.g., a steering wheel, a touch screen display, buttons, knobs, a microphone or other audio capture device, etc.) via input circuitry 108. In some embodiments, a driver of vehicle 101 may be permitted to select certain settings in connection with the operation of vehicle 101. In some embodiments, processing circuitry 102 may be communicatively connected to GPS system 126 or other positioning device of vehicle 101, where the driver may interact with the GPS system via input interface 116. GPS system 126 may be in communication with multiple satellites and/or servers 132 remote from vehicle 101 to ascertain the driver's location and provide navigation directions to processing circuitry 102. As another example, the positioning device may operate on terrestrial signals, such as cell phone signals, WiFi signals, or ultra-wideband signals to determine a location of electric vehicle 101. The determined location may be in any suitable form such as a geographic coordinate, a street address, a nearby landmark such as an identification of the nearest charging station, or a tagged location associated with the vehicle (e.g., a location of a home of the user stored in memory 106). In some embodiments, processing circuitry 102 uses the determined location to identify whether vehicle 101 is within a threshold range of a tagged location.

Processing circuitry 102 may be communicatively connected to display 112 and speaker 113 by way of output circuitry 110. Display 112 may be located at a dashboard of vehicle 101 and/or a heads-up display at a windshield of vehicle 101. For example, an interface for GPS system 126 or an interface of an infotainment system may be generated for display, and display 112 may comprise an LCD display, an OLED display, an LED display, or any other type of display. Speaker 113 may be located at any location within the cabin of vehicle 101, e.g., at the dashboard of vehicle 101, on an interior portion of the vehicle door, etc.

Processing circuitry 102 may be communicatively connected (e.g., by way of sensor interface 114) to sensors (e.g., three-dimensional sensor 122, orientation sensor 118, speed sensor 120). Orientation sensor 118 may be an inclinometer, an accelerometer, a tiltmeter, any other pitch sensor, or any combination thereof and may be configured to provide vehicle orientation values (e.g., vehicle's pitch and/or vehicle's roll) to processing circuitry 102. Speed sensor 120 may be one of a speedometer, a GPS sensor, or the like, or any combination thereof, and may be configured to provide a reading of the vehicle's current speed to processing circuitry 102. Three-dimensional sensor 122 may be positioned at the front of vehicle 101. Three-dimensional sensor 122 may include a second three-dimensional sensor positioned at the rear of vehicle 101. Three-dimensional sensor 122 may be one or more of a variety of types, e.g., a LIDAR sensor, an image sensor, an ultrasonic sensor, a radar sensor, or an LED sensor, etc., that is configured to measure a distance and angle between vehicle 101 and objects (e.g., obstacles and the ground) in a surrounding environment of the vehicle (e.g., by outputting a light or radio wave signal, and measuring a time for a return signal to be detected and/or intensity of the returned signal, and/or performing image processing on images captured by the image sensor of the surrounding environment of vehicle 101). In some embodiments, processing circuitry 102 may take into account the acceleration of vehicle 101, e.g., based on sensor data generated by orientation sensor 118, when determining a predicted distance between vehicle 101 and an object.

Processing circuitry 102 may be communicatively connected to battery system 124, which may be configured to provide power to one or more of the components of vehicle 101 during operation. In some embodiments, vehicle 101 may be an electric vehicle or a hybrid electric vehicle.

In some embodiments, communications circuitry 128 and/or user device 130 (e.g., a mobile device) may be in communication with one or more servers 132 (e.g., over a communications network such as, for example, the Internet), which may be configured to perform any suitable portions of the processing described above and below.

It should be appreciated that FIG. 1 shows only some of the components of vehicle 101, and it will be understood that vehicle 101 also includes other elements commonly found in vehicles (e.g., autonomous and semi-autonomous vehicles), e.g., a motor, brakes, wheels, wheel controls, turn signals, windows, doors, etc.

Figure 2:
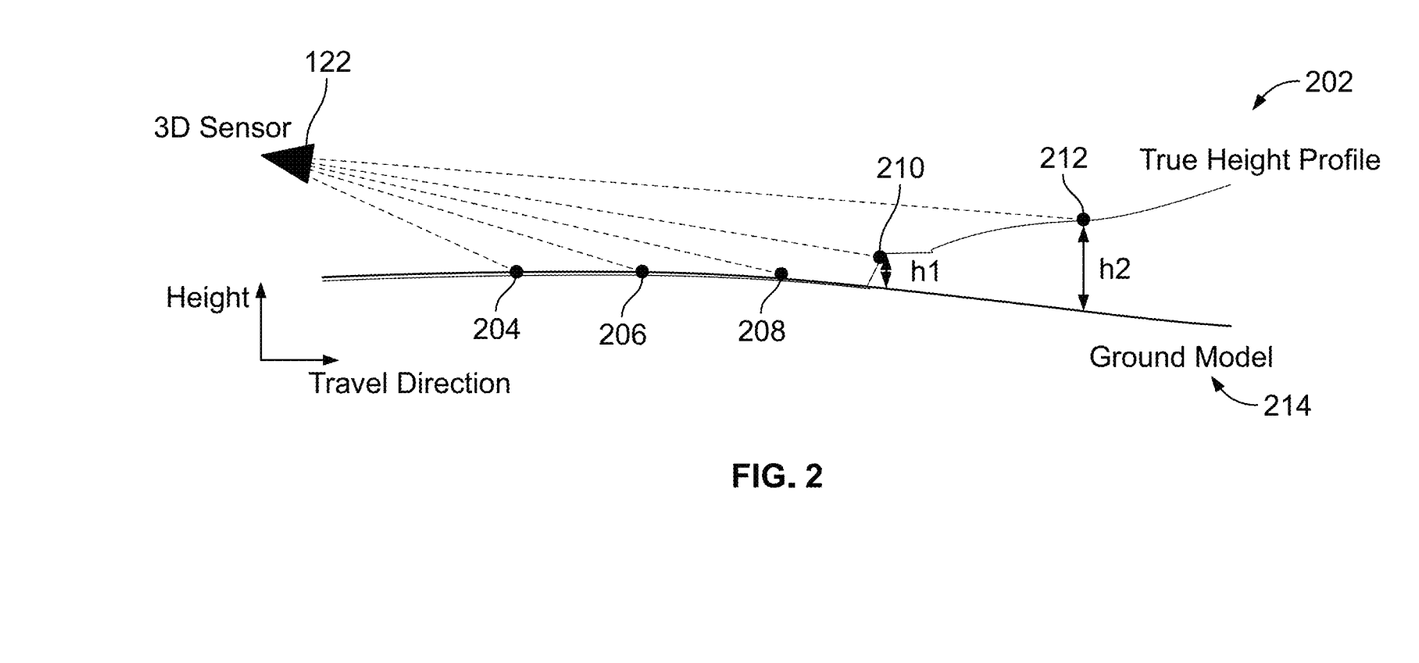
FIG. 2 shows a simplified side view of a three-dimensional sensor capturing three-dimensional data corresponding to an area in front of a vehicle, in accordance with some embodiments of the present disclosure.

FIG. 2 shows a simplified side view of three-dimensional sensor 122 capturing three-dimensional data corresponding to an area in front of vehicle 101, in accordance with some embodiments of the present disclosure. As shown, three-dimensional sensor 122 captures three-dimensional data corresponding to the height of different points (e.g., 204, 206, 208, 210, and 212) in the area in front of vehicle 101 (e.g., true height profile 202). For example, if vehicle 101 is traveling along an off-road trail, the heights at the different points 204-212 may correspond to the respective heights of the off-road trail at different locations along the off-road trail. In one example, three-dimensional sensor 122 may be a LIDAR sensor that targets the area in front of vehicle 101 and measures reflected light returned to the LIDAR sensor (e.g., time delays of reflected pulses of light) to detect the height of the different points (e.g., 204, 206, 208, 210, and 212). However, this is only one example, and three-dimensional sensor 122 may be any sensor that is configured to generate a dense three-dimensional map of the area in front of vehicle 101. The area in front of vehicle 101 refers to the area in front of vehicle 101 with respect to a driving direction. For example, when vehicle 101 is traveling backward, the area in front of vehicle 101 is the area behind the rear of the vehicle.

As discussed above, a conventional system may not be able to determine whether the three-dimensional data of different points 204-212 correspond to a drivable surface (e.g., the ground) or an obstacle on the drivable surface. However, as shown in FIG. 2 and explained in further detail below, ground model 214, which may be generated by fitting a three-dimensional smooth surface based on captured three-dimensional data of the area in front of vehicle 101, may be used to identify a region where the height difference (e.g., h1 and h2) between ground model 214 and the captured three-dimensional data exceeds an obstacle threshold value. In some embodiments, the obstacle threshold value may be set to a value to identify obstacles that should be considered by an autonomous or semi-autonomous driving system. In some embodiments, the obstacle threshold value may be set based on an estimated moving speed of vehicle 101, driver preferences, the terrain of the area in front of vehicle 101, etc.

Figure 3:
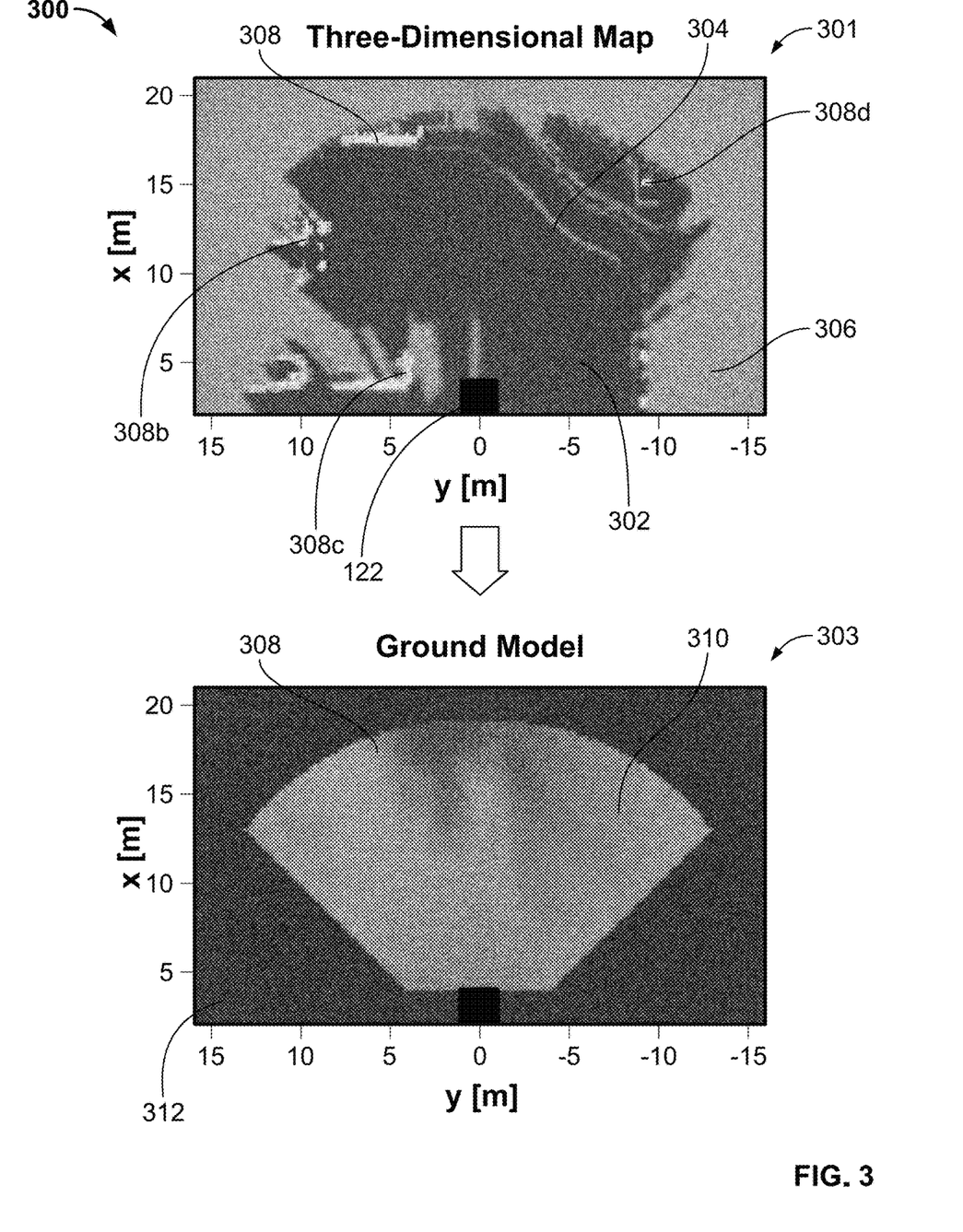
FIG. 3 shows a top view of an illustrative diagram for generating a ground model based on three-dimensional data captured by a three-dimensional sensor, in accordance with some embodiments of the present disclosure.

FIG. 3 shows a top view of an illustrative diagram 300 for generating ground model 303 based on three-dimensional data captured by three-dimensional sensor 122, in accordance with some embodiments of the present disclosure. As shown, three-dimensional map 301 may be populated with three-dimensional data that includes height information for at least some of the sub-areas (e.g., 302) of the area in front of vehicle 101 (e.g., the different grayscale tones represent different heights in the illustrated the xy-plane—"x[m]," y[m]). As shown, three-dimensional sensor 122 may not be able to observe every portion of the area in front of vehicle 101 (e.g., due to "shadows" caused by obstacles or the driving surface with respect to three-dimensional sensor 122). Accordingly, three-dimensional map 301 may include holes (e.g., gaps in the three-dimensional data such as gap/hole 304) and unobserved areas (e.g., unobserved area 306) where no height information is available.

It is advantageous to ensure that a ground model corresponds (e.g., within a predetermined accuracy) to the actual drivable ground surface in areas where an actual drivable ground surface exists. Further, in areas where a drivable ground surface does not exist (e.g., due to other vehicles, bushes, curbs, rocks, etc.), the ground model should extend smoothly from the drivable region to form an ideal drivable ground surface that covers that whole region of interest for drivable space detection (e.g., the area in front of vehicle 101). Accordingly, to generate ground model 303, processing circuitry 102 may divide the area in front of vehicle 101 into a grid comprising a plurality of grid cells. In one example, to do this, processing circuitry 102 may first initialize the grid cells closest to three-dimensional sensor 122 using prior information (e.g., a previously determined ground model), a static ground assumption, etc. Processing circuitry 102 may then iterate through the grid (e.g., k=1, 2, 3 . . . n) in, e.g., an "expanding circles" pattern that mimics the wave-propagation of three-dimensional sensor 122 (e.g., a first iteration (k=1) covers the grid cells adjacent to the initial grid cells, the second iteration (k=2) covers the grid cells adjacent to the grid cells from the first iteration, etc.). For example, light from a LIDAR sensor propagates outward until it interacts with an object (e.g., ground or an obstacle) and is reflected back to the LIDAR sensor.

At iteration k, for each grid cell, processing circuitry 102 may populate sensor measurements using, e.g., the minimum height among all measurements of that grid cell. For grid cells having height information, processing circuitry 102 determines if the populated height of the grid cell exceeds a slope threshold (e.g., a height difference between a grid cell and adjacent grid cells exceeds a slope threshold value). In one example, processing circuitry 102 compares a height difference between a grid cell at iteration k and adjacent grid cells from the iteration k−1. If processing circuitry 102 determines that the populated height of the grid cell exceeds the slope threshold value, processing circuitry 102 reduces the populated height until the height value no longer exceeds the slope threshold (e.g., the reduced height difference between the grid cell and adjacent grid cells is equal to/less than the slope threshold value). For example, as shown, processing circuitry 102 may reduce height values in areas 308a, 308b, 308c, and 308d.

For grid cells not having any height data (e.g., hole 304), processing circuitry 102 may initially assign a null value (e.g., indicating a "to be filled" grid cell). At iteration k, processing circuitry 102 may fill these "to be filled" grid cells using a median of height data of adjacent populated cells, based on the number of adjacent to be filled grid cells. For example, it may be advantageous to limit the size of the holes/unobserved regions (e.g., 304, 306) that are filled based on adjacent populated cells (e.g., corresponding to the area formed grid cells assigned a null value). That is, it may be advantageous to limit the number of grid cells that are populated without confirming the ground via a ground measurement. For example, if a grid cell assigned a null value is greater than a threshold distance away from a grid cell having height data, processing circuitry 102 may not fill this grid cell. For example, as shown, the majority of the unobserved area 306 in three-dimensional map 301 is not "filled in" in ground model 303. In some embodiments, it may be advantageous to vary this threshold distance based on a number of factors, including the terrain, user input, etc. In some embodiments, the size of each grid cell may be approximately 20 cm by 20 cm. However, this is only one example, and the size of each grid cell may be optimized for different parameters (e.g., required processing power, required resolution, resolution of three-dimensional sensor 122, etc.).

As shown, based on the respective heights of the processed grid cells (e.g., unchanged populated heights, reduced heights, filled heights, and unfilled heights), processing circuitry 102 generates ground model 303, including portion 310 where the ground model is available and portion 312 where the ground model is undecided (e.g., not available). To do this, processing circuitry 102 may fit a three-dimensional smooth surface to the processed grid cells by fitting a three-dimensional smooth surface to the populated (minimum) height values and any reduced height values. Processing circuitry 102 may then extend the three-dimensional smooth surface to certain ones of the null height values (e.g., based on a local slope of the three-dimensional smooth surface). It should be understood that processing circuitry 102 may perform additional processing to fit the three-dimensional smooth surface to the processed grid cells, such as removing outliers. As explained in further detail below, based on ground model 303, processing circuitry 102 may identify a drivable space in front of vehicle 101.

Figure 4:
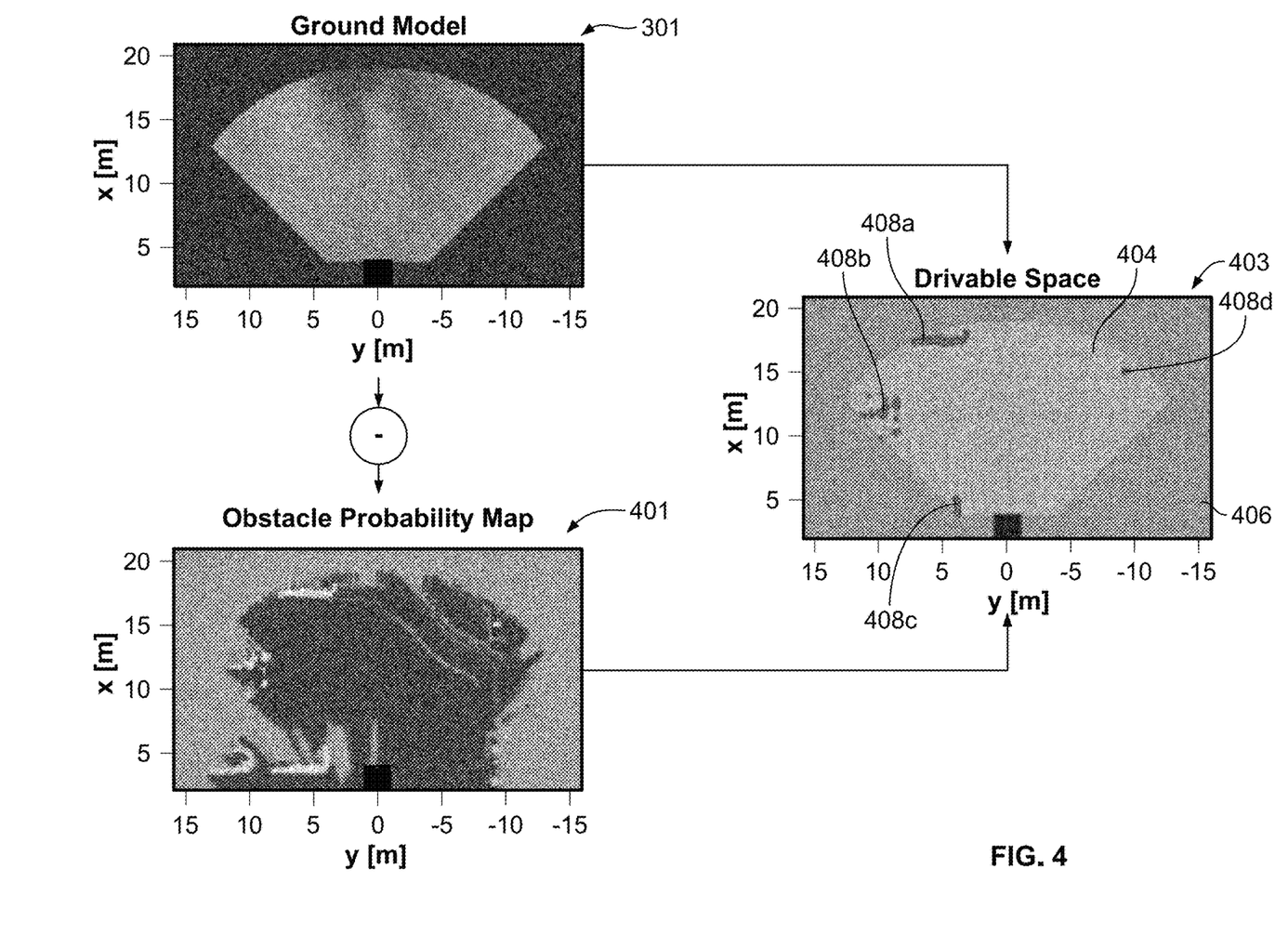
FIG. 4 shows a top view of an illustrative diagram for determining a drivable area in front of a vehicle based on captured three-dimensional data and a ground model, in accordance with some embodiments of the present disclosure.

FIG. 4 shows a top view of an illustrative diagram 400 for determining a drivable area in front of vehicle 101 based on captured three-dimensional data and a ground model, in accordance with some embodiments of the present disclosure. Obstacle probability map 401 may be generated based on the three-dimensional data captured by three-dimensional sensor 122, as discussed above with reference to FIG. 3. In some embodiments, obstacle probability map 401 may identically correspond to three-dimensional map 301 of FIG. 3. However, this is only an example, and the three-dimensional data may also be processed differently (e.g., compared to the processing to generate three-dimensional map 301) to generate obstacle probability map 401. For example, instead of taking the minimum height value for each area (e.g., grid cell), processing circuitry 102 may use other processing methods to determine the height for each area. Ground model 303 may be the ground model discussed above with reference to FIG. 3. However, this is only one example, and ground model 303 may also be a ground model generated in advance (e.g., by a different vehicle) and downloaded by vehicle 101 (e.g., from server 132), as discussed in further detail below.

As shown, to identify obstacles, processing circuitry 102 may compare ground model 303 with obstacle probability map 401 to generate drivable space 403. For example, processing circuitry 102 may compare ground model 303 with obstacle probability map 401 to identify regions (e.g., 408a, 408b, 408c, and 408d) where height differences between ground model 303 and obstacle probability map 401 exceed an obstacle threshold value. Additionally, as shown, processing circuitry 102 may identify drivable area 404 and undetermined area 406 of the area in front of vehicle 101. Drivable area 404 may be an area where ground model 303 is available and that is free from the identified obstacle regions (e.g., 408a, 408b, 408c, and 408d). Undetermined area 406 may be an area that processing circuitry 102 is not able to identify conclusively (e.g., within a certain confidence value) as a drivable area (e.g., free of obstacles).

Figure 5:
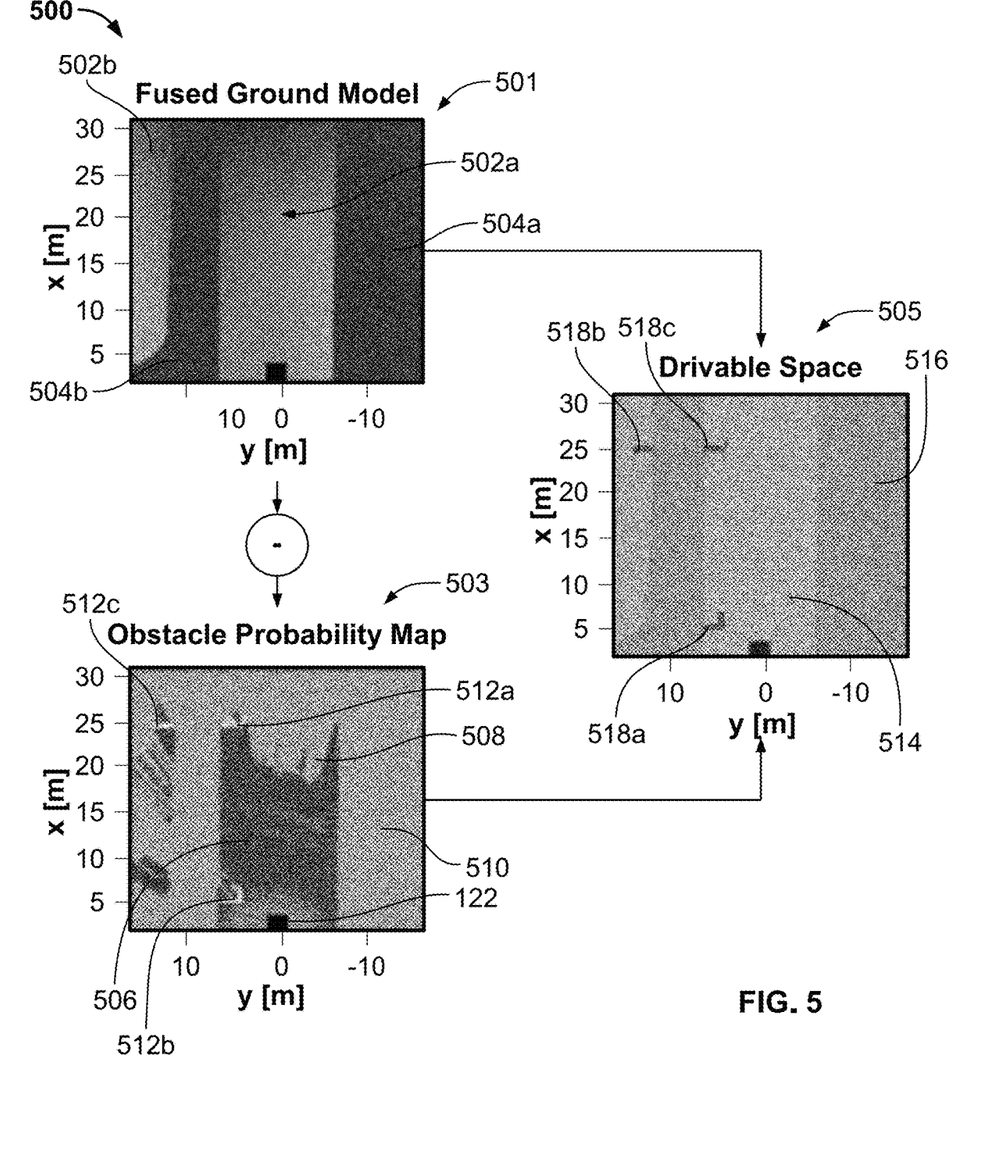
FIG. 5 shows a top view of an illustrative diagram for determining a drivable area in front of a vehicle based on captured three-dimensional data and a retrieved ground model, in accordance with some embodiments of the present disclosure.

FIG. 5 shows a top view of an illustrative diagram 500 for determining a drivable area in front of vehicle 101 based on captured three-dimensional data and a retrieved ground model, in accordance with some embodiments of the present disclosure. In some embodiments, vehicle 101 may determine if any pregenerated ground models are available for download. For example, based on the location of vehicle 101 (e.g., provided by GPS system 126), vehicle 101 may submit an inquiry to a remote database (e.g., server 132) for a pregenerated ground model. In some embodiments, vehicle 101 may also submit the inquiry in advance in response to a user request. For example, if a user plans to travel to a particular trail, vehicle 101 may download a pregenerated ground model of the trail before vehicle 101 arrives at the trail (e.g., when vehicle 101 is connected to WiFi). Pregenerated ground models may be generated by one or more other vehicles (e.g., or by vehicle 101 at an earlier time). In response to receiving a pregenerated ground model, processing circuitry 102 may generate fused ground model 501.

In one example, to generate fused ground model 501, processing circuitry 102 may confirm that the current location of vehicle 101 corresponds to the location associated with fused ground model 501. In another example, processing circuitry 102 may confirm that the retrieved pregenerated ground model is valid by comparing three-dimensional data with the retrieved pregenerated ground model to ensure that they sufficiently correspond to each other. For example, driving surfaces, especially in off-road applications, may change over time (e.g., due to erosion, landslides, shifting rocks and trees, etc.). Thus, based on the comparing, processing circuitry 102 may confirm that the driving surface has not significantly changed since the pregenerated ground model was generated. In some embodiments, it may be advantageous to periodically update pregenerated ground models based on ground models generated by other vehicles (e.g., using the same popular trail).

In yet another example, processing circuitry 102 may use portions of the retrieved pregenerated ground model to fill holes in a ground model generated by vehicle 101 in real time (e.g., ground model 303 of FIG. 3). However, it should be understood that the retrieved pregenerated ground model may be verified or combined with real-time, three-dimensional data in any suitable way to obtain fused ground model 501. As shown, fused ground model 501 may correspond to a parking lot including portions (e.g., 502a, 502b) where the ground model is available and portions (e.g., 504a, 504b) where the ground model is undecided (e.g., not available). For example, when fused ground model 501 corresponds to a parking lot, the portions (e.g., 504a, 504b) where the ground model is undecided or not determined may correspond to curb areas that form the edges of the drivable area of the parking lot.

As shown, processing circuitry 102 may generate obstacle probability map 503 using three-dimensional data captured by three-dimensional sensor 122 (e.g., in a similar manner as discussed above with reference to FIG. 3 or 4). For example, as shown, obstacle probability map 503 may be populated with three-dimensional data that includes height information for at least some of the sub-areas (e.g., 506) of the area in front of vehicle 101. As shown, obstacle probability map 503 may include holes (e.g., 508), unobserved areas (e.g., 510), and high-height regions (e.g., 512a, 512b, and 512c), which are determined based on a comparison with fused ground model 501.

As shown, to identify obstacles, processing circuitry 102 may compare fused ground model 501 with obstacle probability map 503 to generate drivable space 505, as similarly described above with reference to FIG. 4. For example, processing circuitry 102 may compare fused ground model 501 with obstacle probability map 503 to identify regions (e.g., 518a, 518b, and 518c) where height differences between fused ground model 501 and obstacle probability map 503 exceed an obstacle threshold value. Additionally, as shown, processing circuitry 102 may identify drivable area 514 and undetermined area 516 of the area in front of vehicle 101, as similarly discussed above with reference to FIG. 4.

Figure 6:
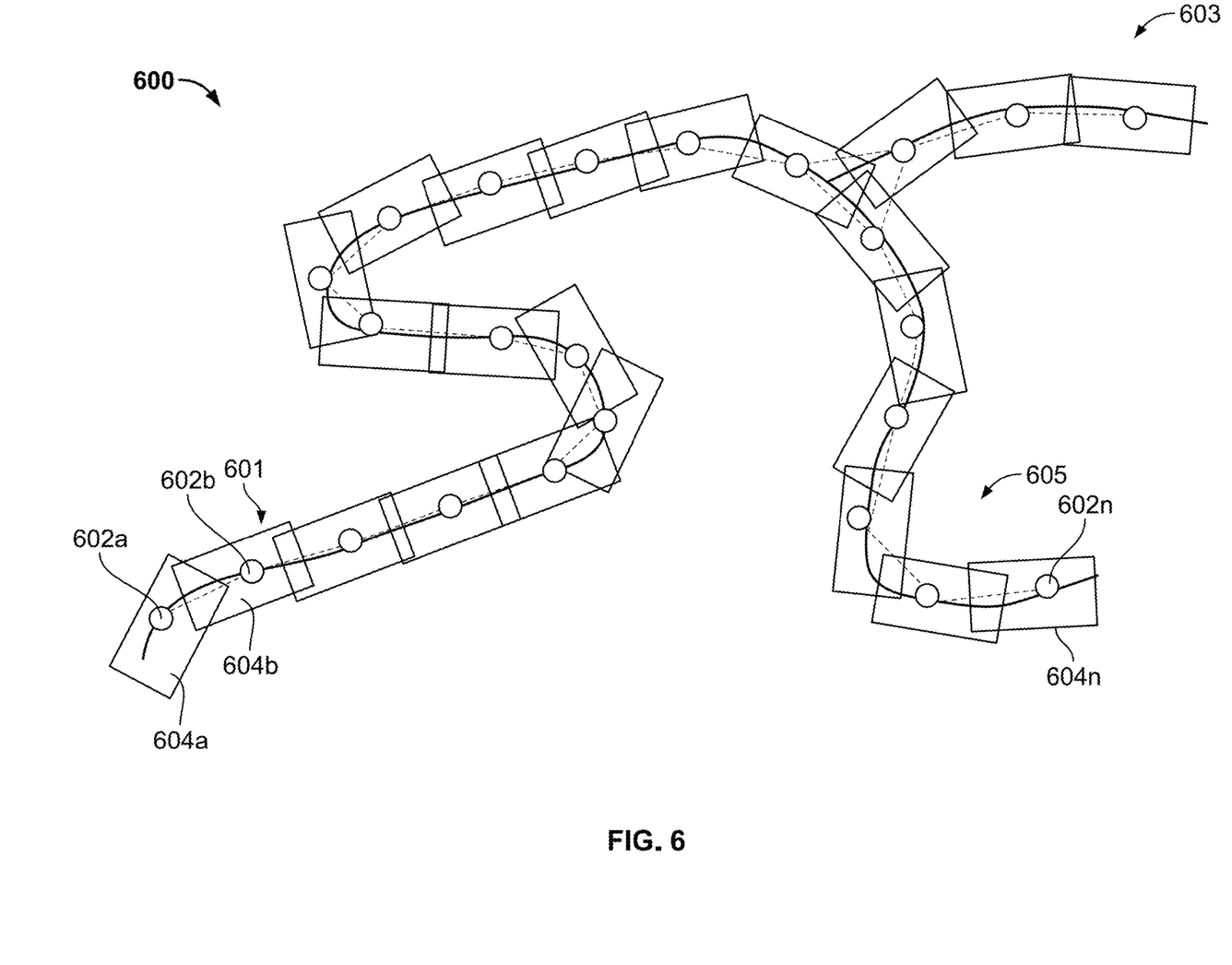
FIG. 6 shows an illustrative diagram of a ground model map, in accordance with some embodiments of the present disclosure.

FIG. 6 shows an illustrative diagram of ground model map 600, in accordance with some embodiments of the present disclosure. As shown, ground model map 600 may include a plurality of road segments 601, 603, and 605 corresponding to a road network. In one example, the road network may be an off-road network (e.g., off-road trails). As shown, each of the plurality of road segments 601, 603, and 605 may include a plurality of map segments (e.g., 604a, 604b, . . . 604n) that collectively cover the plurality of road segments 601, 603, and 605. Each one of the plurality of map segments (e.g., 604a, 604b, . . . 604n) may, for example, cover a region corresponding to a size needed for a single determination of drivable space in real time (e.g., such as ground model 501 of FIG. 5). Each of the plurality of map segments (e.g., 604a, 604b, . . . 604n) may be stored in a graph structure where each of a plurality of nodes (e.g., 602a, 602b . . . 602n) respectively corresponds to the origins of each of the plurality of map segments (e.g., 604a, 604b, . . . 604n), while the edges of the graph structure may determine how each of the plurality of map segments (e.g., 602a, 602b . . . 602n) is connected to the others.

Processing circuitry 102 may individually retrieve each of the plurality of map segments (e.g., 602a, 602b . . . 602n) of ground model map 600 (or one or more of the plurality of road segments 601, 603, and 605) from one or more servers 132 in real time or in advance (e.g., when vehicle 101 is connected to WiFi). In some embodiments, when processing circuitry 102 retrieves the plurality of map segments (e.g., 602a, 602b . . . 602n) in advance, processing circuitry 102 may store each of the retrieved plurality of map segments (e.g., 602a, 602b . . . 602n) in a memory (e.g., memory 106). Thereafter, based on location information (e.g., retrieved from GPS 126), processing circuitry 102 may load map segments from memory as needed (e.g., individually), thereby avoiding excessive memory usage that would be required to simultaneously load ground model map 600 into memory. In some embodiments, ground model map 600 may be generated by vehicle 101 during an earlier trip, may be generated or averaged by a plurality of vehicles (e.g., that drive on the same route), may be generated by a high-resolution mapping vehicle, etc.

Figure 7:
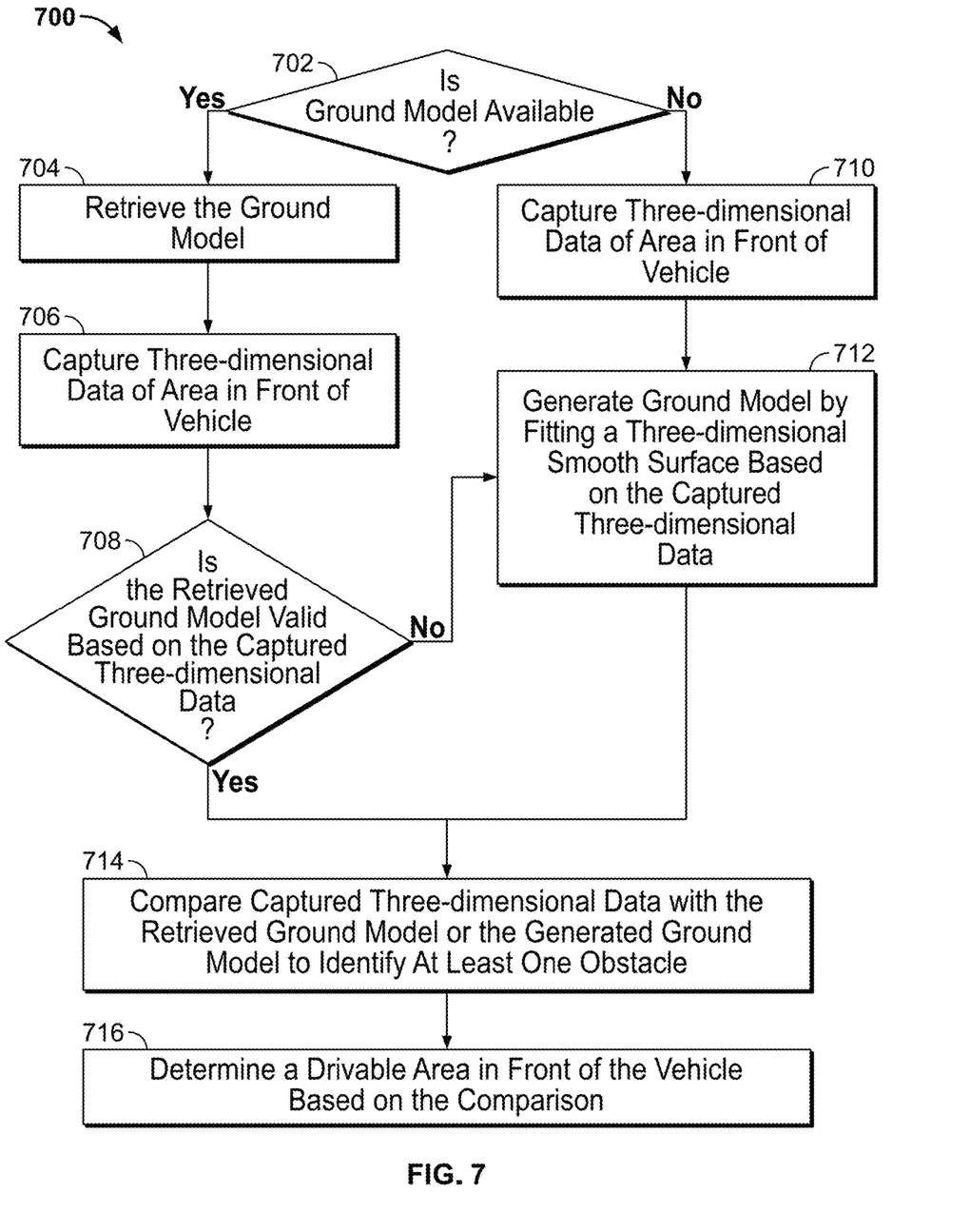
FIG. 7 shows a flowchart of an illustrative process for identifying a drivable area in front of a vehicle, in accordance with some embodiments of the present disclosure.

FIG. 7 shows a flowchart of an illustrative process 700 for identifying a drivable area in front of a vehicle, in accordance with some embodiments of the present disclosure. Process 700 may be performed at least in part by processing circuitry 102 and/or user device 130.

At 702, processing circuitry 102 determines if a ground model is available. For example, processing circuitry 102 may submit a request to a server (e.g., server 132) based on the current location of vehicle 101 (e.g., indicated by GPS 126 or by a location specified by a user). In some embodiments, as detailed above, ground models may be retrieved in advance and stored in a memory (e.g., memory 106). In response to determining that a ground model is available ("Yes" at 702), processing may proceed to 704. Otherwise ("No" at 702), processing may proceed to 710.

At 704, processing circuitry 102 retrieves the ground model. For example, processing circuitry 102 may retrieve the ground model from one or more servers 132. In some embodiments, processing circuitry 102 may retrieve the ground model in advance and store the retrieved ground model in a memory (e.g., memory 106).

At 706, processing circuitry 102 captures (e.g., using three-dimensional sensor 122) three-dimensional data of an area in front of vehicle 101 (e.g., with respect to a traveling direction of vehicle 101).

At 708, processing circuitry 102 determines if the retrieved ground model is valid based on the captured three-dimensional data. For example, processing circuitry 102 compares a portion of the captured three-dimensional data to the retrieved ground model to confirm that the area in front of vehicle 101 has not significantly changed since the retrieved ground model was generated. For example, if the area in front of vehicle 101 is an off-road trail, processing circuitry 102 may confirm that the off-road trail has not shifted significantly (e.g., due to a landslide, falling rock, falling trees, erosion). In response to determining that the retrieved ground model is valid ("Yes" at 708), processing may proceed to 714. Otherwise ("No" at 708), processing may proceed to 712 to generate a ground model, as described in further detail below.

At 710, in response to determining that the ground model is not available ("No" at 702), processing circuitry 102 captures three-dimensional data of the area in front of vehicle 101.

At 712, processing circuitry 102 generates a ground model by fitting a three-dimensional smooth surface based on the captured three-dimensional data, as explained in further detail below with reference to FIG. 8.

At 714, processing circuitry 102 compares captured three-dimensional data (e.g., from 706 or 710) with either the retrieved ground model or the generated ground model to identify at least one obstacle. For example, processing circuitry 102 determines regions where height differences between the captured three-dimensional data and the retrieved or generated ground model exceed an obstacle threshold value. In some embodiments, the obstacle threshold value may be set based on attributes of vehicle 101, attributes of the road surface, or user preference.

At 716, processing circuitry 102 determines a drivable area in front of vehicle 101 based on the comparison of 714. For example, processing circuitry 102 may determine the drivable area as an area where the ground model is available (e.g., within a certain confidence) and free from identified obstacles, that is, an area where vehicle 101 is predicted to be able to drive.

Figure 8:
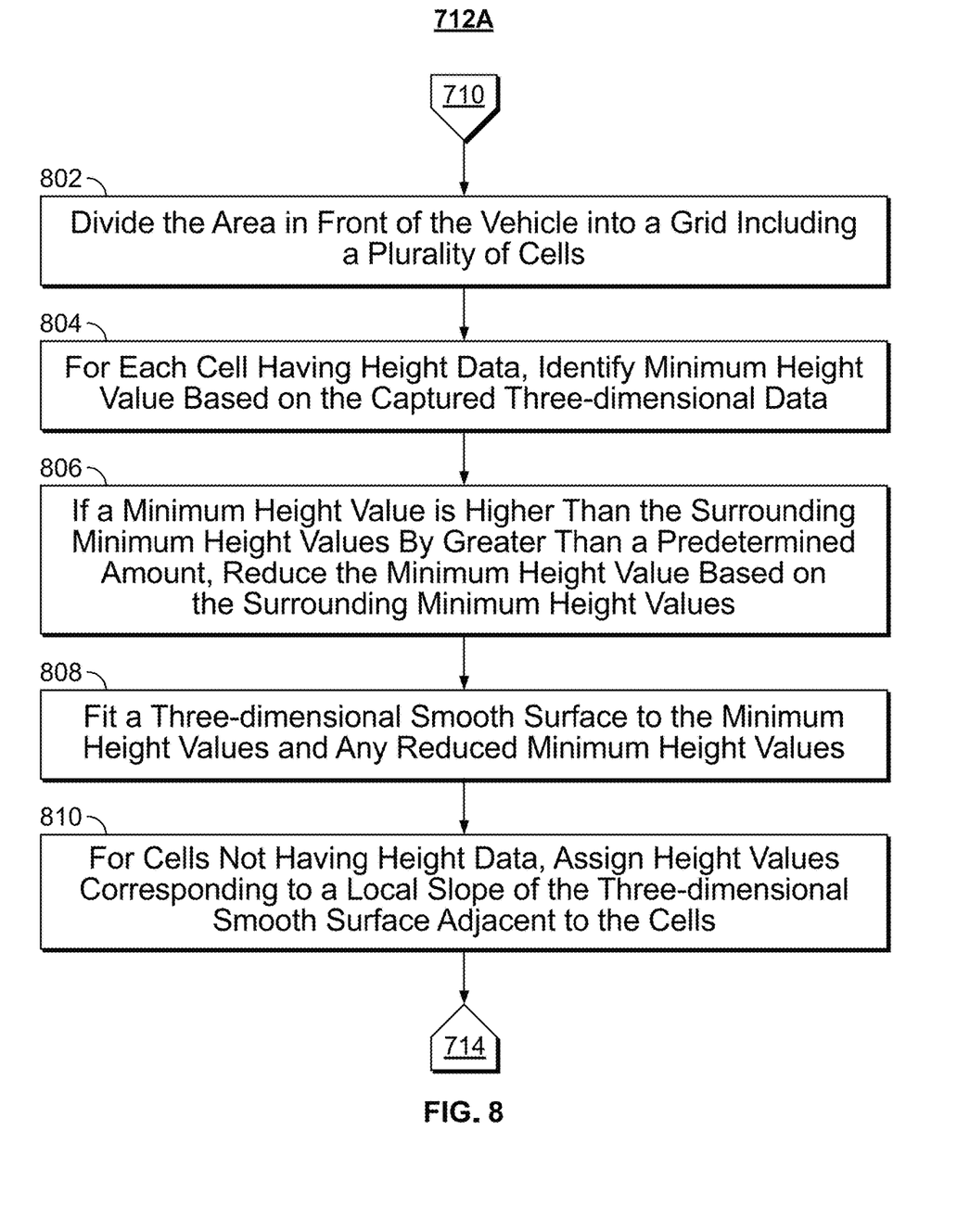
FIG. 8 shows a flowchart of an illustrative process for generating a ground model, in accordance with some embodiments of the present disclosure.

FIG. 8 shows a flowchart of an illustrative process 712A for generating a ground model, in accordance with some embodiments of the present disclosure. Process 712A is one embodiment of a method for performing 712 of FIG. 7 and begins after 710 or 708. Process 712A may be performed at least in part by processing circuitry 102 and/or user device 130.

At 802, processing circuitry 102 may divide the area in front of vehicle 101 into a grid including a plurality of cells. The size of each cell may be set based on the resolution of three-dimensional sensor 122, processing and storage resources of vehicle 101, and the complexity of the terrain in front of vehicle 101. In one example, each cell may be approximately 20 cm by 20 cm.

At 804, processing circuitry 102, for each cell having height data, identifies the minimum height value based on the captured three-dimensional data. That is, processing circuitry 102 may process signals from three-dimensional sensor 122 (e.g., a LIDAR sensor) to identify the values most likely to correspond to the ground.

At 806, processing circuitry 102, if a minimum height value is higher than the surrounding minimum height values (e.g., of adjacent cells) by greater than a predetermined amount (e.g., a maximum allowed slope), reduces the minimum height value based on the surrounding minimum height values. For example, processing circuitry 102 reduces the minimum height value until the difference between the reduced minimum height value and the surrounding minimum height values is less than or equal to the predetermined amount. Processing circuitry 102 may also filter out outlier values.

At 808, processing circuitry 102 fits a three-dimensional smooth surface to the minimum height values and any reduced minimum height values.

At 810, processing circuitry 102, for cells not having height data, assigns height values corresponding to a local slope of the three-dimensional smooth surface adjacent to the cells. That is, processing circuitry 102 extends the three-dimensional smooth surface to cells not having height data. Processing may then return to 714 of FIG. 7.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. For example, 702-708 may be omitted to reduce the bandwidth and storage requirements of vehicle 101 (e.g., based on the complexity and number of obstacles in the area in front of vehicle 101).

The foregoing is merely illustrative of the principles of this disclosure, and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations thereto and modifications thereof, which are within the spirit of the following claims.

What is claimed is:

1. A method of identifying a drivable area in front of a vehicle, comprising:
    capturing, with a three-dimensional measurement sensor, three-dimensional data corresponding to an area in front of the vehicle;
    determining, based on a location of the vehicle, whether a stored three-dimensional ground model is available for the location;
    in response to determining that the stored three-dimensional ground model is not available for the location:
        dividing the area in front of the vehicle into a grid comprising a plurality of cells;
        determining, based on the captured three-dimensional data, height data corresponding to each cell of the plurality of cells;
        for each respective cell having height data, identifying a minimum height value for the respective cell based on the captured three-dimensional data;
        comparing the minimum height value for the respective cell to a minimum height value for an adjacent cell in the grid to determine whether the minimum height value for the respective cell exceeds the minimum height value for the adjacent cell by greater than a predetermined amount;
        in response to determining that the minimum height value for the respective cell exceeds the minimum height value for the adjacent cell by greater than the predetermined amount, reducing the minimum height value for the respective cell, such that the reduced minimum height value does not exceed the minimum height value for the adjacent cell by greater than the predetermined amount; and
        generating a three-dimensional ground model based on fitting a three-dimensional smooth surface to the minimum height values and reduced minimum height values for the plurality of cells;
    comparing the captured three-dimensional data with the three-dimensional ground model to identify at least one obstacle;
    determining a drivable area in front of the vehicle based on the comparison; and
    controlling a driving path of the vehicle based on the determined drivable area in front of the vehicle.

2. The method of claim 1, wherein generating the three-dimensional ground model comprises determining whether the slope of any portion of the three-dimensional smooth surface does not exceed a threshold value.

3. The method of claim 1, wherein the adjacent cell is one of a plurality of adjacent cells in the grid, and wherein comparing the minimum height value for the respective cell to the minimum height value for the adjacent cell in the grid comprises:
    for each cell of the plurality of adjacent cells, identifying a local minimum height value for the plurality of adjacent cells; and
    in response to determining that the minimum height value for the respective cell is higher than the local minimum height value by greater than the predetermined amount, reducing the minimum height value for the respective cell such that the minimum height value for the respective cell is not higher than the minimum height value by greater than the predetermined amount.

4. The method of claim 1, wherein fitting the three-dimensional smooth surface further comprises:
    for each cell not having height data, assigning a null value; and
    replacing the assigned null values with height values corresponding to a local slope of the three-dimensional smooth surface adjacent to the cells not having height data.

5. The method of claim 1, wherein comparing the captured three-dimensional data with the three-dimensional ground model to identify at least one obstacle comprises:
    determining height differences between the captured three-dimensional data and the three-dimensional ground model; and
    identifying at least one region where the determined height differences exceed an obstacle threshold value.

6. The method of claim 1, wherein the three-dimensional measurement sensor is a LIDAR sensor.

7. The method of claim 1, wherein the ground model is a generated ground model, further comprising:
    in response to determining that the stored three-dimensional ground model is available for the location, retrieving, from a memory, the stored three-dimensional ground model based on the location of the vehicle.

8. The method of claim 7, further comprising:
    determining if the retrieved three-dimensional ground model is valid by comparing the captured three-dimensional data with the retrieved three-dimensional ground model;
    in response to determining that the retrieved three-dimensional ground model is valid, the comparing the captured three-dimensional data with the three-dimensional ground model to identify at least one obstacle comprises comparing the captured three-dimensional data with the retrieved three-dimensional ground model; and in response to determining that the retrieved three-dimensional ground model is not valid, the comparing the captured three-dimensional data with the three-dimensional ground model to identify at least one obstacle comprises comparing the captured three-dimensional data with the generated three-dimensional ground model.

9. The method of claim 8, wherein comparing the captured three-dimensional data with the retrieved three-dimensional ground model comprises:
   determining height differences between the identified height values and corresponding height values included in the retrieved three-dimensional ground model; and
   identifying at least one region where the determined height differences exceed an obstacle threshold value.

10. A system for identifying a drivable area in front of a vehicle, the system comprising:
   a three-dimensional measurement sensor configured to capture three-dimensional data corresponding to an area in front of the vehicle; and
   processing circuitry configured to:
      determine, based on a location of the vehicle, whether a stored three-dimensional ground model is available for the location;
      in response to determining that the stored three-dimensional ground model is not available for the location:
         divide the area in front of the vehicle into a grid comprising a plurality of cells;
         determine, based on the captured three-dimensional data, height data corresponding to each cell of the plurality of cells;
         for each respective cell having height data, identify a minimum height value for the respective cell based on the captured three-dimensional data;
         compare the minimum height value for the respective cell to a minimum height value for an adjacent cell in the grid to determine whether the minimum height value for the respective cell exceeds the minimum height value for the adjacent cell by greater than a predetermined amount;
         in response to determining that the minimum height value for the respective cell exceeds the minimum height value for the adjacent cell by greater than the predetermined amount, reduce the minimum height value for the respective cell, such that the reduced minimum height value does not exceed the minimum height value for the adjacent cell by greater than the predetermined amount; and
         generate a three-dimensional ground model based on fitting a three-dimensional smooth surface to the minimum height values and reduced minimum height values for the plurality of cells;
      compare the captured three-dimensional data with the three-dimensional ground model to identify at least one obstacle;
      determine a drivable area in front of the vehicle based on the comparison; and
      controlling a driving path of the vehicle based on the determined drivable area in front of the vehicle.

11. The system of claim 10, wherein the processing circuitry is further configured to generate the three-dimensional ground model based on determining whether the slope of any portion of the three-dimensional smooth surface does not exceed a threshold value.

12. The system of claim 10, wherein the adjacent cell is one of a plurality of adjacent cells in the grid and wherein the processing circuitry is further configured, when comparing the minimum height value for the respective cell to the minimum height value for the adjacent cell in the grid comprises, to:
   for each cell of the plurality of adjacent cells, identify a local minimum height value for the plurality of adjacent cells; and
   in response to determining that the minimum height value for the respective cell is higher than the local minimum height value by greater than the predetermined amount, reduce the minimum height value for the respective cell such that the minimum height value for the respective cell is not higher than the surrounding minimum height value by greater than the predetermined amount.

13. The system of claim 10, wherein the processing circuitry is further configured, when fitting the three-dimensional smooth surface, to:
   for each cell not having height data, assign a null value; and
   replace the assigned null values with height values corresponding to a local slope of the three-dimensional smooth surface adjacent to the cells not having height data.

14. The system of claim 10, wherein the processing circuitry is further configured, when comparing the captured three-dimensional data with the three-dimensional ground model to identify at least one obstacle, to:
   determine height differences between the captured three-dimensional data and the three-dimensional ground model; and
   identify at least one region where the determined height differences exceed an obstacle threshold value.

15. The system of claim 10, wherein the three-dimensional measurement sensor is a LIDAR sensor.

16. The system of claim 10, wherein the ground model is a generated ground model, and wherein the processing circuitry is further configured to:
   in response to determining that the stored three-dimensional ground model is available for the location, retrieve, from a memory, the stored three-dimensional ground model based on the location of the vehicle.

17. The system of claim 16, wherein:
   the processing circuitry is further configured to determine if the retrieved three-dimensional ground model is valid by comparing the captured three-dimensional data with the retrieved three-dimensional ground model;
   in response to determining that the retrieved three-dimensional ground model is valid, the processing circuitry is further configured, when comparing the captured three-dimensional data with the three-dimensional ground model to identify at least one obstacle, to compare the captured three-dimensional data with the retrieved three-dimensional ground model; and
   in response to determining that the retrieved three-dimensional ground model is not valid, the processing circuitry is further configured, when comparing the captured three-dimensional data with the three-dimensional ground model, to compare the captured three-dimensional data with the generated three-dimensional ground model.

18. The system of claim 16,
wherein the processing circuitry is further configured, when comparing the captured three-dimensional data with the three-dimensional ground model, to:
determine height differences between the identified height values and corresponding height values included in the retrieved three-dimensional ground model; and
identify at least one region where the determined height differences exceed an obstacle threshold value.

19. A non-transitory computer-readable medium having non-transitory computer-readable instructions encoded thereon that, when executed by a processor, causes the processor to:
cause a three-dimensional measurement sensor to capture three-dimensional data corresponding to an area in front of a vehicle;
determine, based on a location of the vehicle, whether a stored three-dimensional ground model is available for the location;
in response to determining that the stored three-dimensional ground model is not available for the location:
divide the area in front of the vehicle into a grid comprising a plurality of cells;
determine, based on the captured three-dimensional data, height data corresponding to each cell of the plurality of cells;
for each respective cell having height data, identify a minimum height value for the respective cell based on the captured three-dimensional data;
compare the minimum height value for the respective cell to a minimum height value for an adjacent cell in the grid to determine whether the minimum height value for the respective cell exceeds the minimum height value for the adjacent cell by greater than a predetermined amount;
in response to determining that the minimum height value for the respective cell exceeds the minimum height value for the adjacent cell by greater than the predetermined amount, reduce the minimum height value for the respective cell, such that the reduced minimum height value does not exceed the minimum height value for the adjacent cell by greater than the predetermined amount; and
generate a three-dimensional ground model based on fitting a three-dimensional smooth surface to the minimum height values and reduced minimum height values for the plurality of cells;
compare the captured three-dimensional data corresponding to the area in front of the vehicle with the three-dimensional ground model to identify at least one obstacle;
determine a drivable area in front of the vehicle based on the comparison; and
controlling a driving path of the vehicle based on the drivable area in front of the vehicle.

\* \* \* \* \*